(12) United States Patent
Nakamura et al.

(10) Patent No.: US 7,889,276 B2
(45) Date of Patent: Feb. 15, 2011

(54) MOUNTING DEVICE

(75) Inventors: Yoshikazu Nakamura, Chiba (JP); Toshiaki Yamada, Saitama (JP)

(73) Assignee: Hoya Corporation, Tokyo (JP)

( * ) Notice: Subject to any disclaimer, the term of this patent is extended or adjusted under 35 U.S.C. 154(b) by 425 days.

(21) Appl. No.: 12/178,924

(22) Filed: Jul. 24, 2008

(65) Prior Publication Data

US 2009/0066875 A1     Mar. 12, 2009

(30) Foreign Application Priority Data

Jul. 27, 2007 (JP) .............................. 2007-196029

(51) Int. Cl.
*H04N 5/225* (2006.01)
*H04N 5/64* (2006.01)
*G02F 1/1333* (2006.01)

(52) U.S. Cl. .......................... 348/374; 348/794; 349/60

(58) Field of Classification Search ............ 348/333.01, 348/373, 374, 375, 794, 818, 836; 349/60
See application file for complete search history.

(56) References Cited

U.S. PATENT DOCUMENTS

| | | | | |
|---|---|---|---|---|
| 6,034,751 | A * | 3/2000 | Kamiya ........................ | 349/60 |
| 6,724,445 | B2 * | 4/2004 | Natsuyama .................. | 349/58 |
| 6,788,894 | B2 * | 9/2004 | Suzuki et al. ............... | 396/287 |
| 7,130,005 | B2 * | 10/2006 | Takata et al. ................... | 349/58 |
| 7,755,884 | B2 * | 7/2010 | Horiuchi et al. ......... | 361/679.24 |
| 2002/0191121 | A1 * | 12/2002 | Fleetwood et al. .......... | 348/818 |
| 2003/0202118 | A1 | 10/2003 | Hirunuma et al. | |
| 2005/0200737 | A1 * | 9/2005 | Shinohara et al. ...... | 348/333.01 |
| 2007/0019002 | A1 | 1/2007 | Kurosawa | |
| 2007/0109650 | A1 | 5/2007 | Yamada et al. | |

FOREIGN PATENT DOCUMENTS

JP          10-336493          12/1998
JP          2005-210407        8/2005

OTHER PUBLICATIONS

English language Abstract of JP 2005-210407, Aug. 4, 2005.
English language Abstract of JP 10-336493, Dec. 18, 1998.

* cited by examiner

*Primary Examiner*—John M Villecco
(74) *Attorney, Agent, or Firm*—Greenblum & Bernstein P.L.C.

(57) ABSTRACT

A mounting device is provided having a base, first mounting arms, second mounting arms, first engaging portions, and second engaging portions. The base is annular and has an elastic body. Both first and second mounting arms have elastic bodies and extend from said base in the outward radial direction of said base. The first engaging portions project orthogonally to the axis of said base from the edge of said first mounting arms. The second engaging portions project in the direction opposite to the projection direction of said first engaging portions, from the edge of said second mounting arms. The first engaging portions project parallel to each other in the same direction.

10 Claims, 15 Drawing Sheets

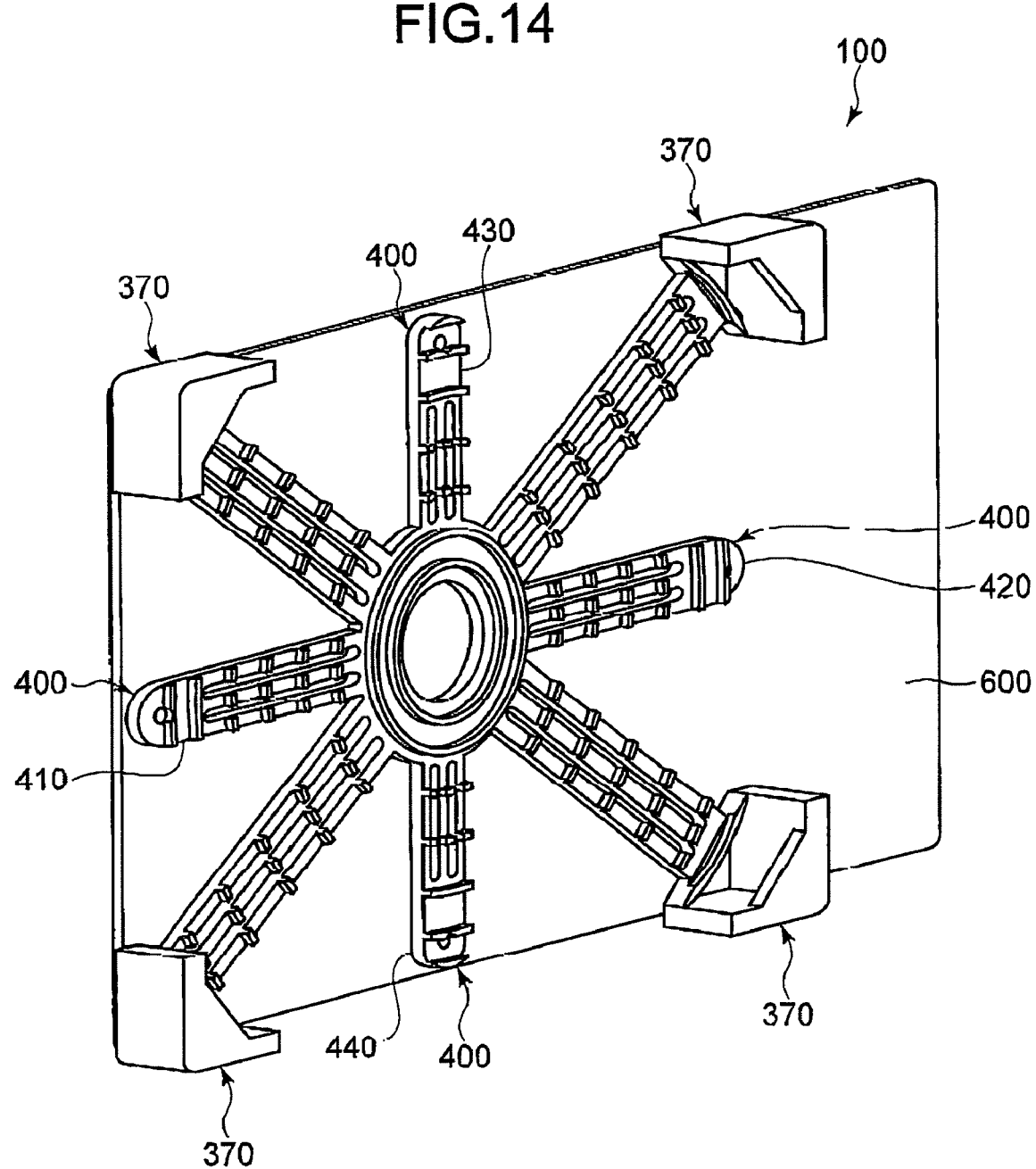

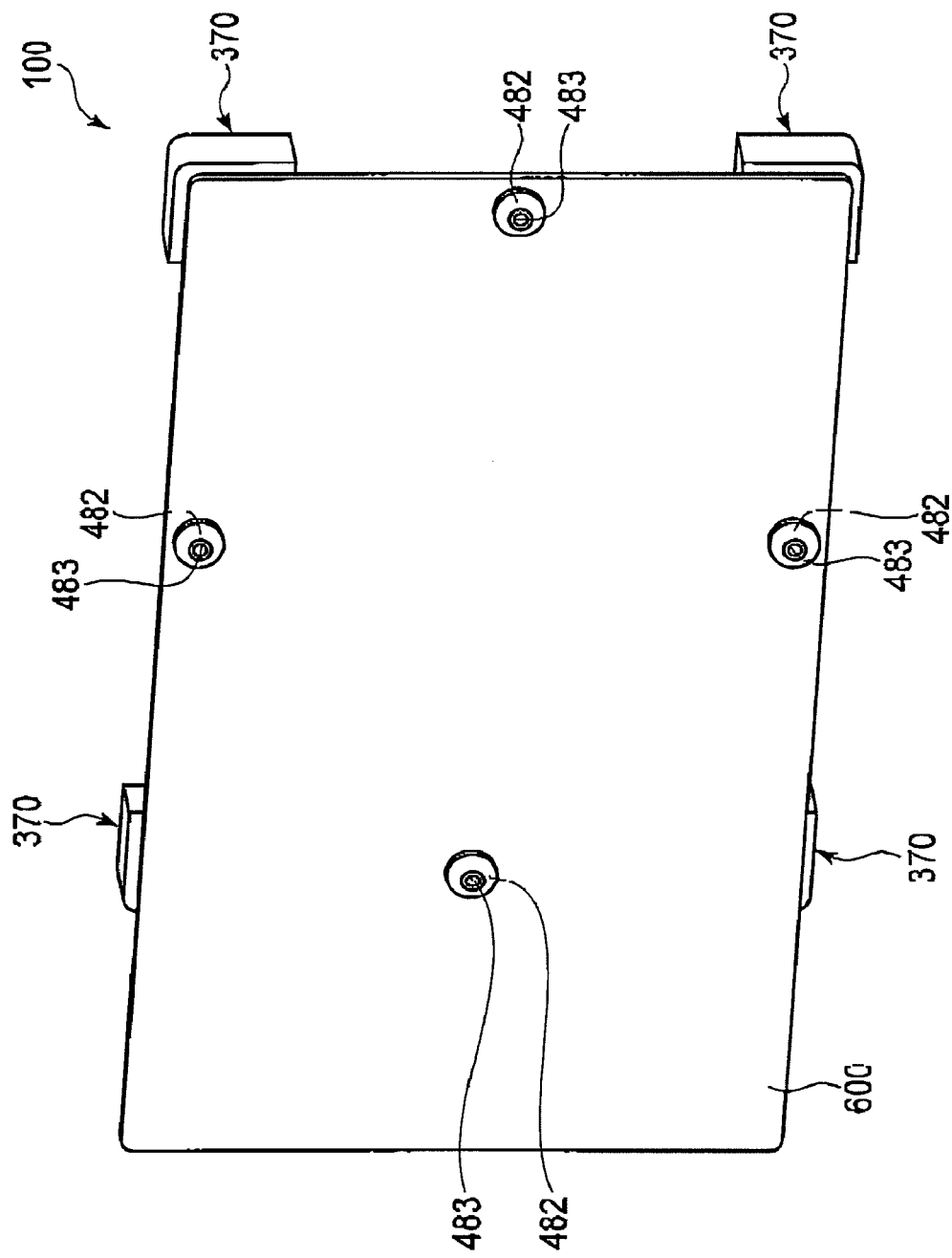

MOUNTING DEVICE

BACKGROUND OF THE INVENTION

1. Field of the Invention

The present invention relates to a mounting device, and more particularly, to a mounting device which mounts members to each other.

2. Description of the Related Art

A mounting device is used for mounting a liquid-crystal panel, for example, to another member. For example, a liquid panel is placed between an exterior member of a portable device and a substrate and mounted directly to the substrate so as to simplify the manufacturing process and reduce the cost of manufacturing. Such construction is disclosed in Japanese Unexamined Patent Publication (KOKAI) No. 2005-210407.

However, in the case that an impact experienced by the portable device is transferred directly to the liquid crystal panel, the impact is also felt on the attached portions of the liquid crystal panel since the substrate also has weight, so both the liquid crystal panel as well as the substrate may be cracked.

SUMMARY OF THE INVENTION

An object of the present invention is to provide a mounting device which absorbs and tempers power created on the attached portions of members while allowing easy attachment of the members to each other.

According to the present invention, there is provided a mounting device which has a base, first mounting arms, second mounting arms, first engaging portions, and second engaging portions. The base is annular and has an elastic body. The first and second mounting arms have elastic bodies and extend from the base in the outward radial direction of the base. The first engaging portions project orthogonally to the axis of the base from the edge of the first mounting arms. The second engaging portions project in the direction opposite to the projection direction of the first engaging portions, from the edge of the second mounting arms. The first engaging portions project parallel to each other in the same direction.

BRIEF DESCRIPTION OF THE DRAWINGS

The objects and advantages of the present invention will be better understood from the following description, with reference to the accompanying drawings in which:

FIG. 14 is a perspective view of the mounting device mounted to the substrate, taken from left-front; and FIG. 15 is a perspective view of the mounting device mounted to the substrate, taken from the back right.

DESCRIPTION OF THE PREFERRED EMBODIMENTS

Figure 1:
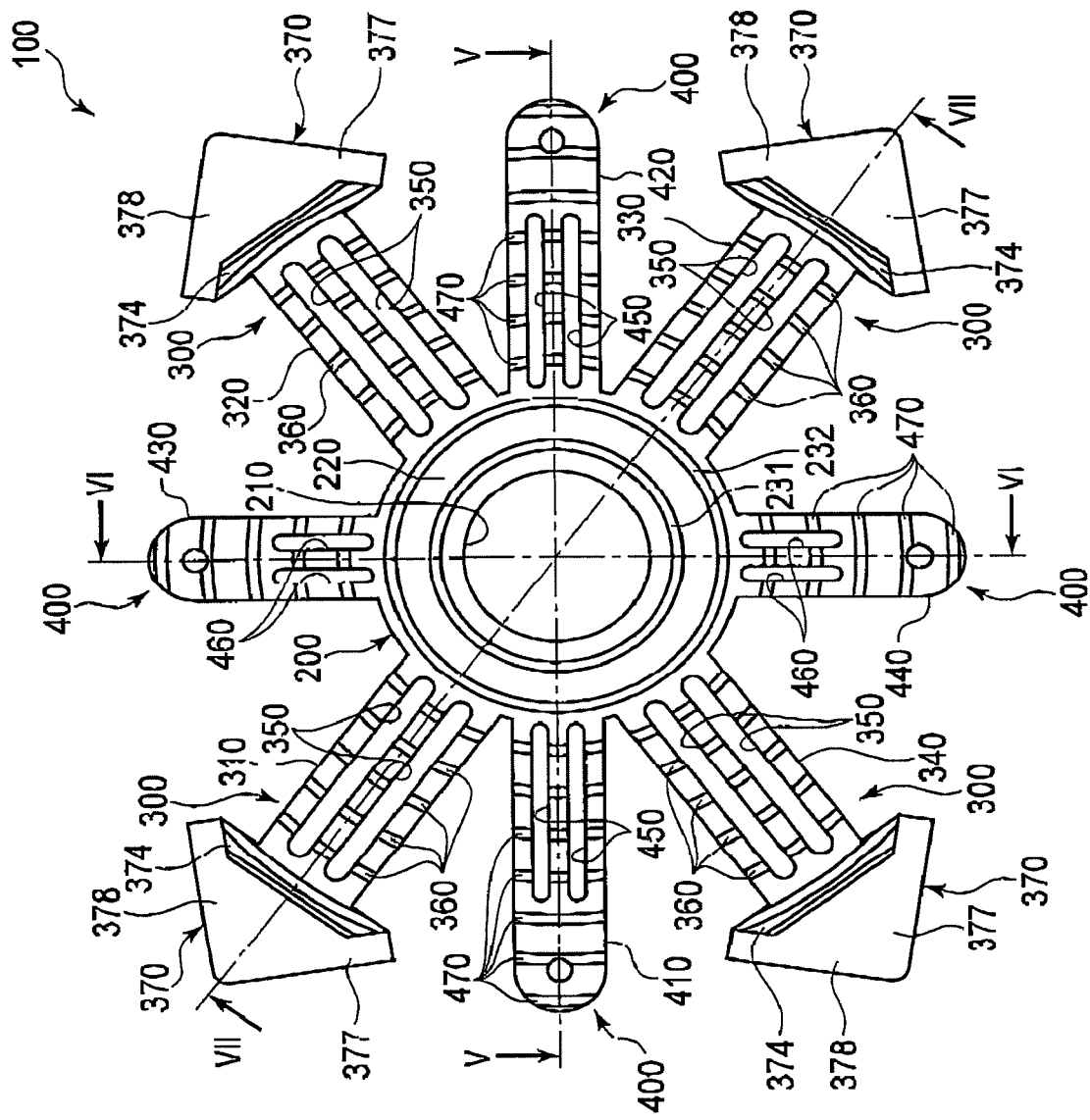
FIG. 1 is a front view of a mounting device, in the first embodiment of the present invention.
Figure 2:
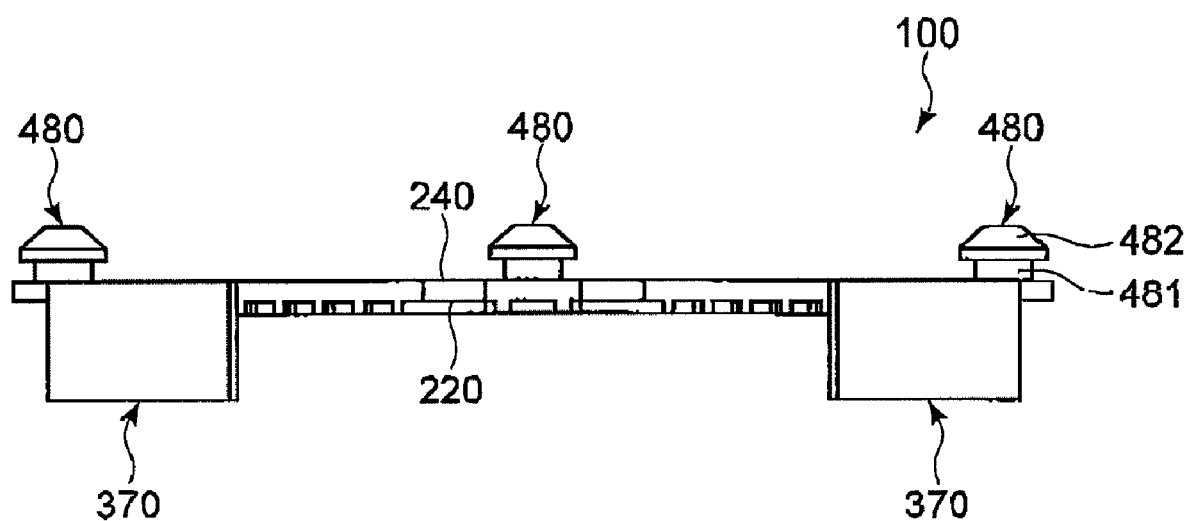
FIG. 2 is a plan view of the mounting device.
Figure 3:
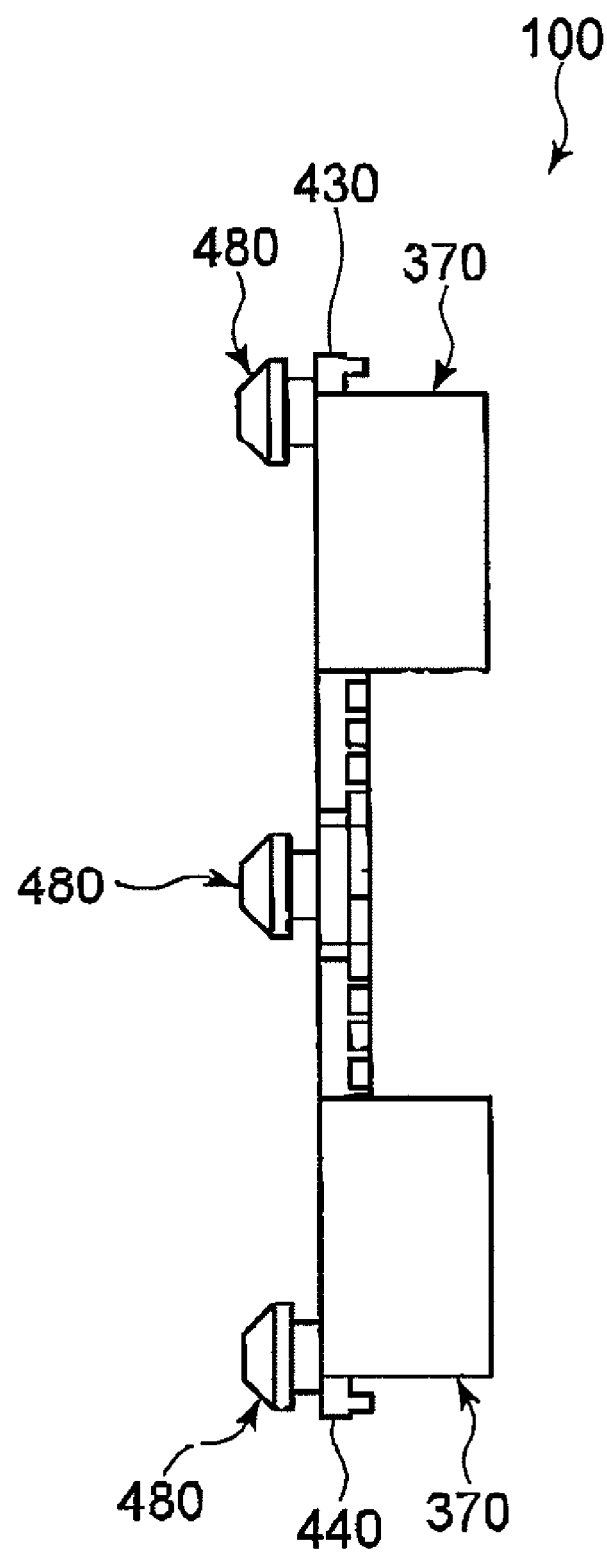
FIG. 3 is a left-side elevational view of the mounting device.
Figure 4:
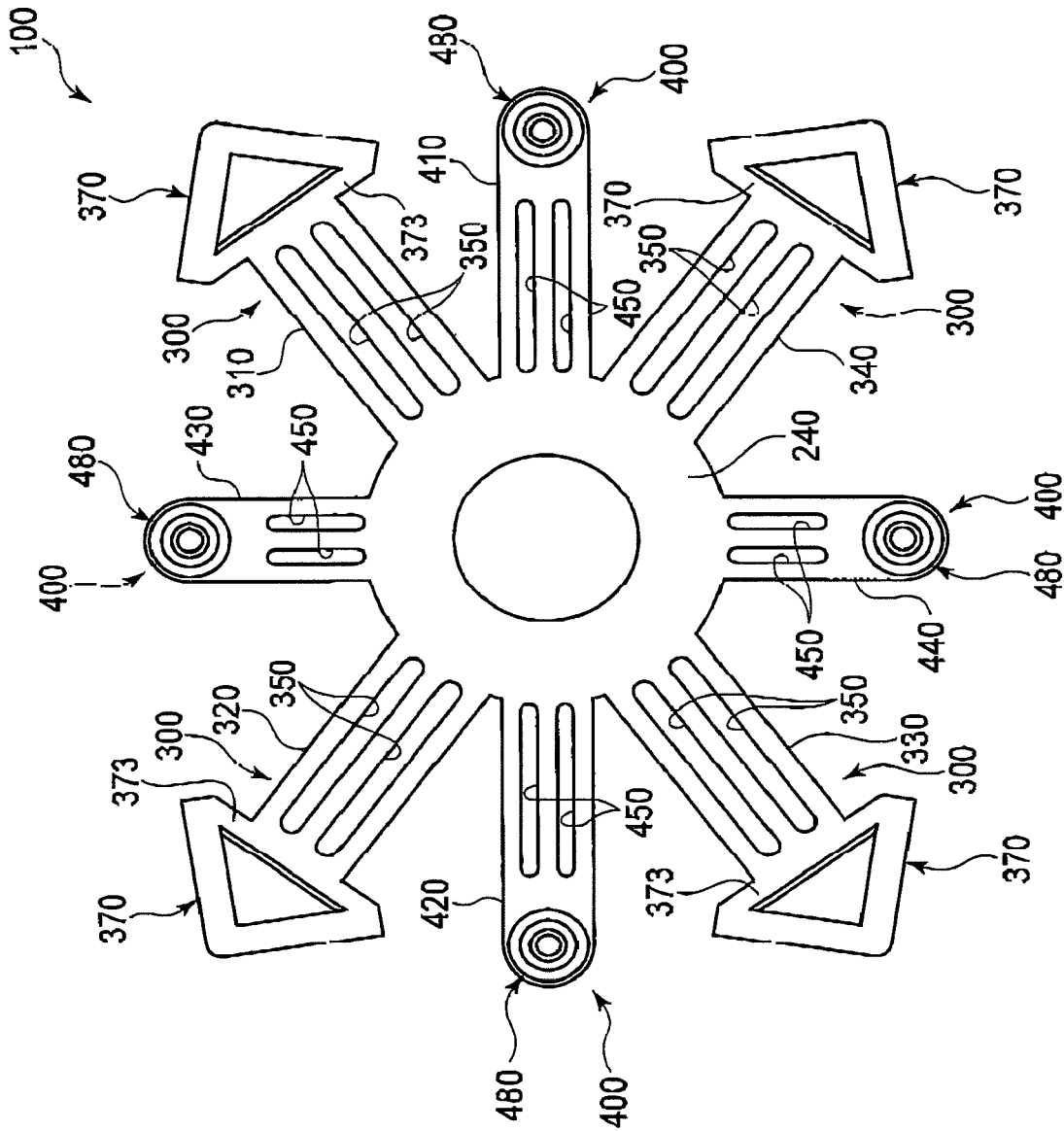
FIG. 4 is a rear view of the mounting device.
Figure 5:
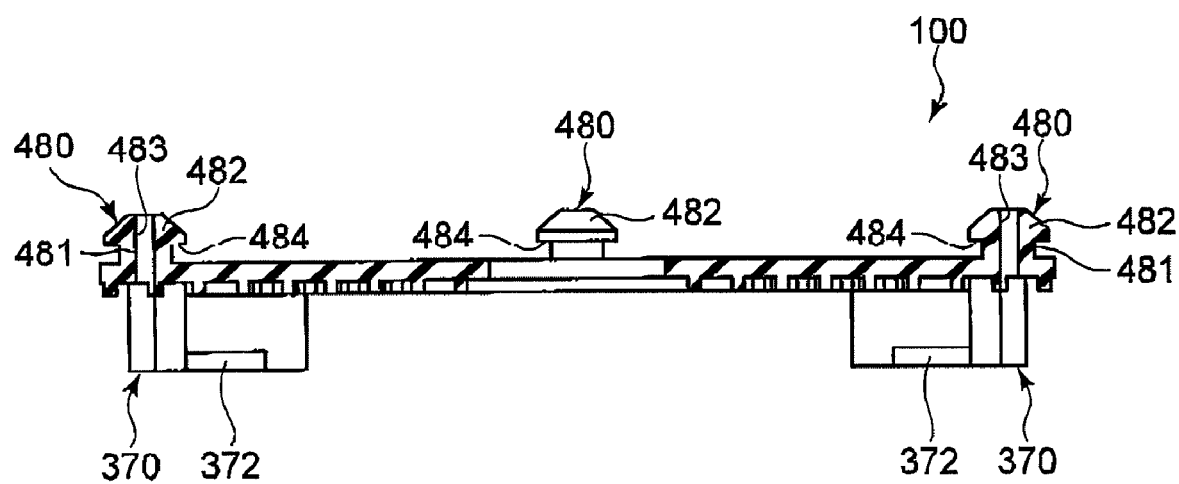
FIG. 5 is a cross-sectional view off the mounting device, taken along line V-V of FIG. 1.
Figure 6:
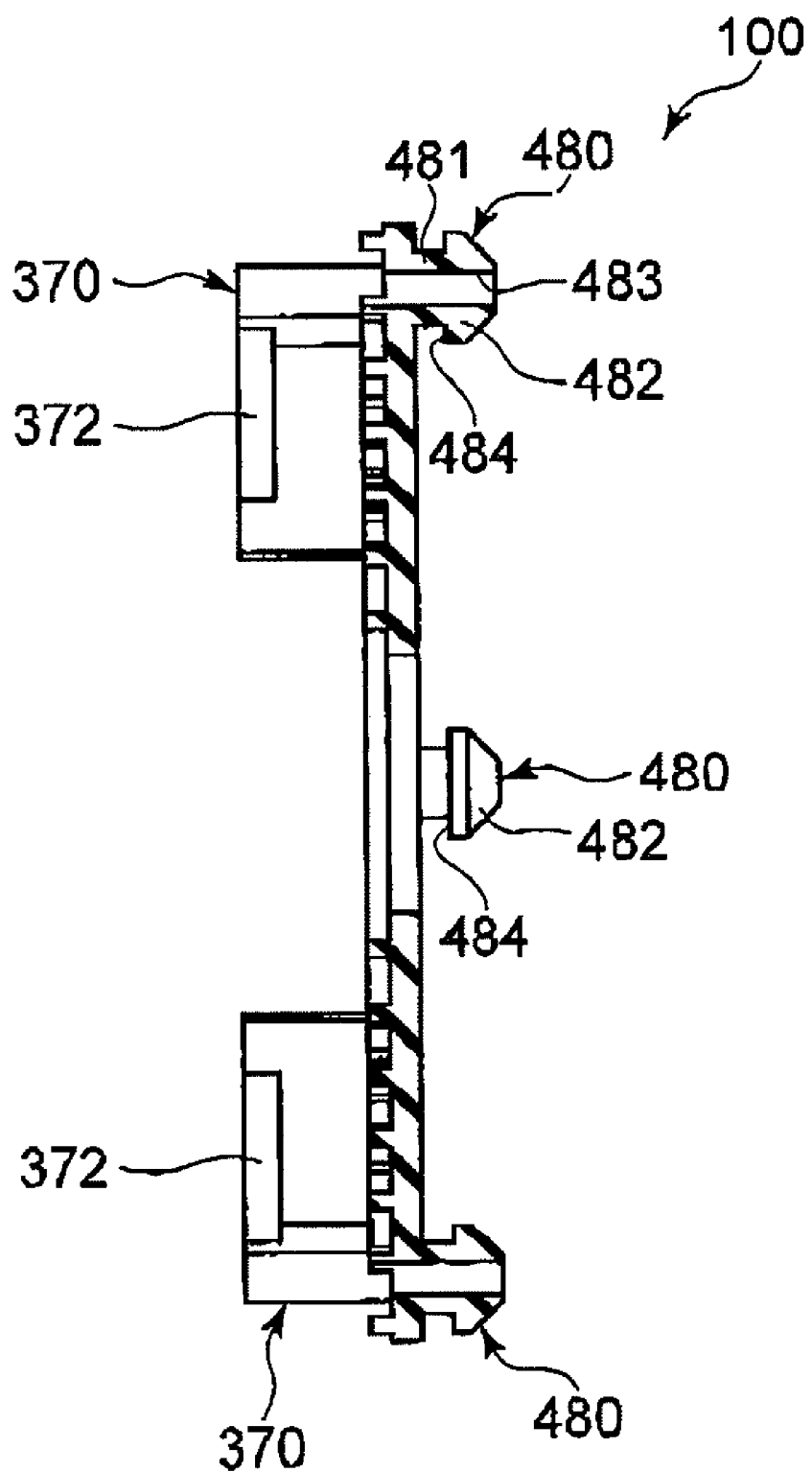
FIG. 6 is a cross-sectional view of the mounting device, taken along line VI-VI of FIG. 1.
Figure 7:
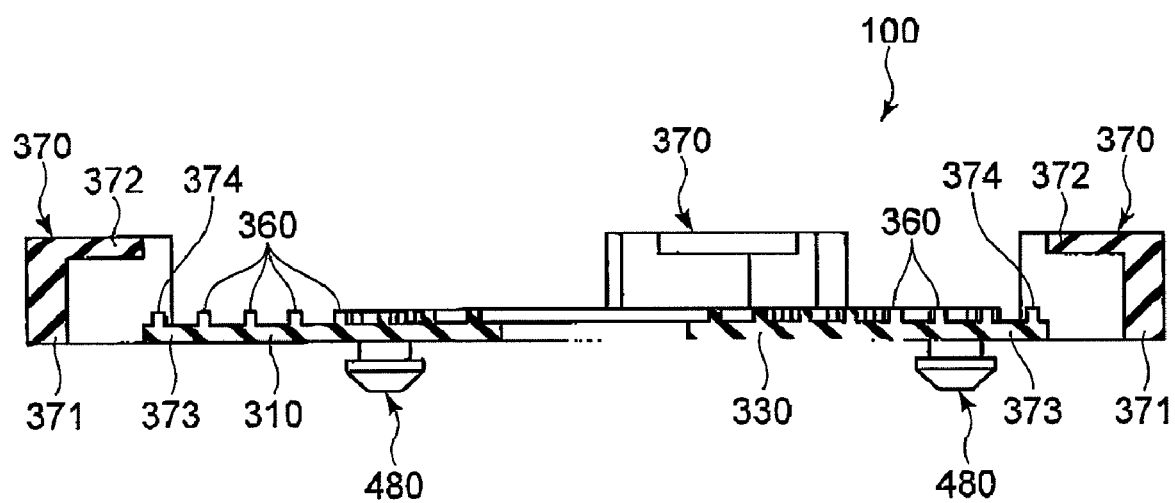
FIG. 7 is a cross-sectional view of the mounting device, taken along line VII-VII of FIG. 1.
Figure 8:
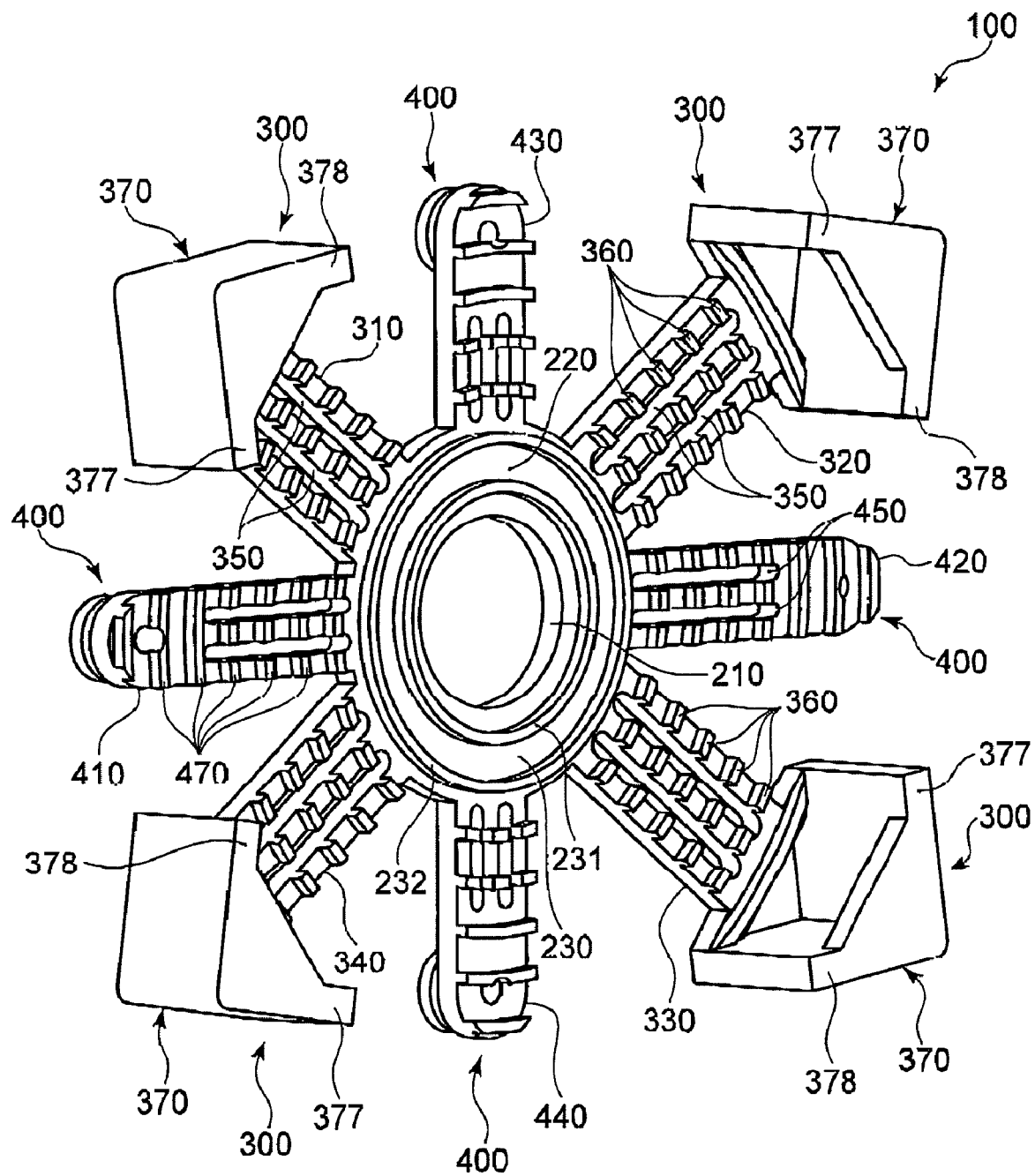
FIG. 8 is a perspective view of the mounting device, taken from the front left.
Figure 9:
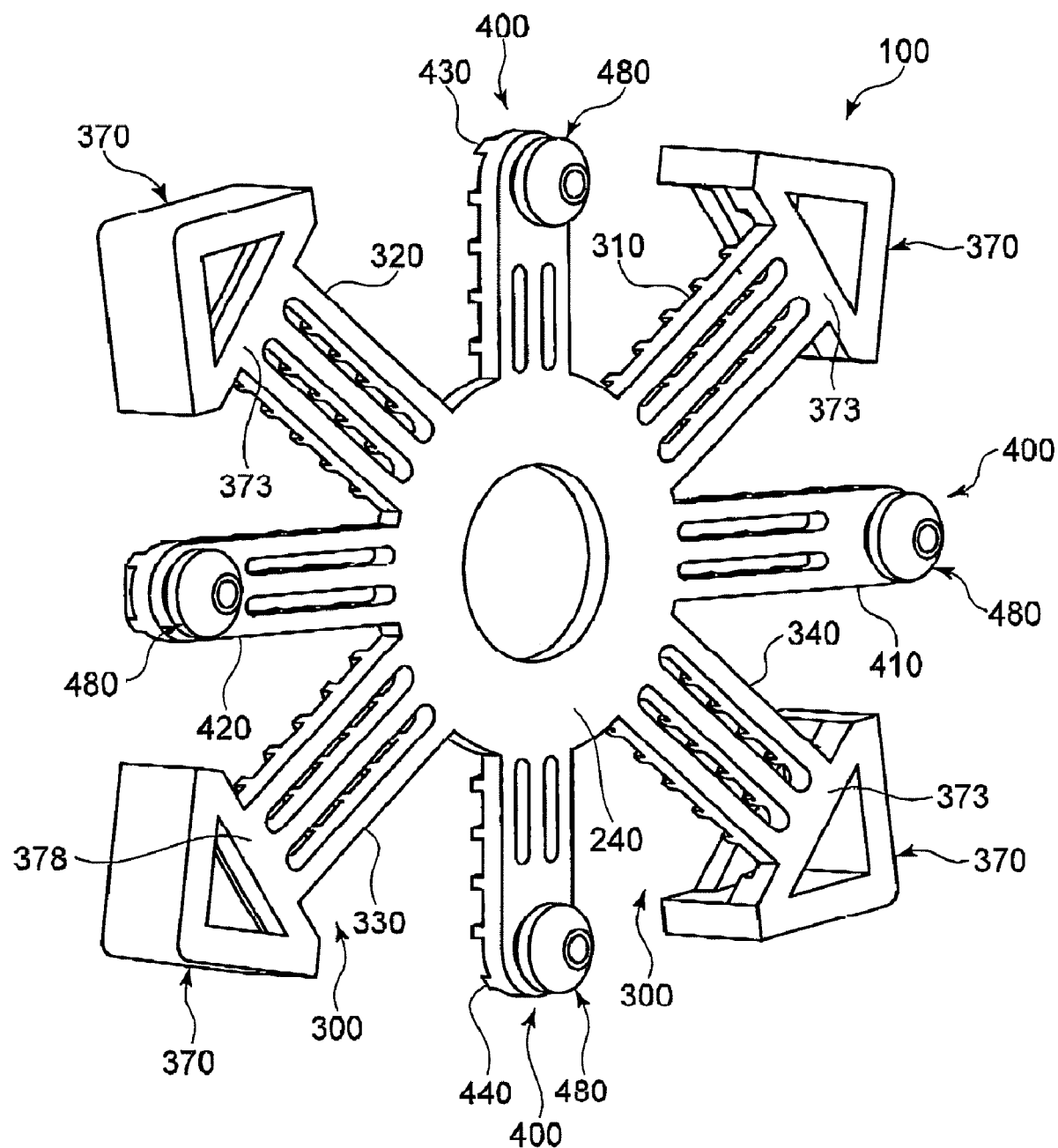
FIG. 9 is a perspective view of the mounting device, taken from the back right.

The present invention is described below with reference to the embodiments shown in the drawings.

The mounting device 100 might be used to attach a liquid crystal panel onto a substrate and is described below with reference to FIGS. 1 to 9. The mounting device 100 has an approximately rectangular shape.

The mounting device 100 is made of an elastic material, and comprises a base 200 having a ring shape and thickness, first mounting arms 300, and second mounting arms 400 extending from the base 200 in the outward radial direction.

The base 200 contains a third hole 210 which passes through its thickness direction and whose central axis runs coaxially with the central axis of the base 200, a first surface 220 which is annulus, and a second surface 240 which is the rear side of the first surface 220. Two third absorbers 231 and 232 are provided on the first surface 220 so that third absorbers 231 and 232 and the third hole 210 are arranged in a concentric pattern. Third absorbers 231 and 232 are an inner concentric projection 231 and an outer concentric projection 232 which project parallel to the axis of the base 220 from the first surface 220. The lengths of the inner and outer concentric projections 231 and 232 in their radial direction are considered their width, and their lengths in the axial direction are considered their thickness. The widths and thicknesses are approximately the same.

The distance between the third hole 210 and the inner concentric projection 231 is approximately twice the width of the inner concentric projection 231. The distance between the outer concentric projection 232 and the inner concentric projection 231 is approximately 1.5 times the distance between the third hole 210 and the inner concentric projection 231. The distance between the outer edge of the base 200 and the outer concentric projection 232 is approximately the same as the width of the outer concentric projection.

Second arms 400 comprise first and second long arm portions 410 and 420 and first and second short arm portions 430 and 440. All of them are provided on the outer edge of the base 200 along four lines which intersect the axis of the base 200 and extend in the radial direction of the base 200. The first and second short arm portions 430 and 440 extend orthogonally to the extension direction of the first and second long arm portions 410 and 420. The first and second long arm portions 410 and 420 are longer than the first and second short arm portions 430 and 440, and the width of the first and second long arm portions 410 and 420 and the first and second short arm portions 430 and 440 are approximately the same. The thickness of the first and second long arm portions 410 and 420 and the first and second short arm portions 430 and 440 is approximately the same. The front surface of the first and second long arm portions 410 and 420 and the front surface of the first and second short arm portions 430 and 440 form a continuous surface with the first surface 220 of the base 200, so that extends the first surface 220. The rear surface of the first and second long arm portions 410 and 420 and the rear surface of the first and second short arm portions 430 and 440 form a continuous surface with the second surface 220 of the base 200, and extend the first surface 240.

The first and second long arm portions 410 and 420 are located symmetrically with respect to each other about the central axis of the base 200, with the same applying to the first and second short arm portions 430 and 440. That is, the first and second long arm portions 410 and 420 are symmetrical about the line which intersects the central axis of the base 200 and is parallel to the extension direction of the first and second short arm portions 430 and 440. The first and second short arm portions 430 and 440 are symmetrical about the line which intersects the central axis of the base 200 and is parallel, to the extension direction of the first and second long arm portions 410 and 420.

Two second holes 450 are provided in each of the first and second long arm portions 410 and 420. The two second holes 460 are provided in each of the first and second short arm portions 430 and 440. Second holes 450 and 460 are oblongs whose narrow sides are arcs and extend from the proximity of the base 200 in the extension direction of the first and second long arm portions 410 and 420 and the first and second short arm portions 430 and 440. The second holes 450 and 460 pass through the first and second long arm portions 410 and 420 and the first and second short arm portions 430 and 440, through their thickness direction. The length of the second holes 450 provided in the first and second long arm portions 410 and 420 is approximately ⅔ the length of the first and second long arm portions 410 and 420. The length of the second holes 460 provided in the first and second short arm portions 430 and 440 are approximately ½ the length of the first and second short arm portions. The width of the second holes 450 and 460 is approximately ⅕ the width of the first and second long arm portions 410 and 420 and the first and second short arm portions 430 and 440. The second holes 450 and 460 help the first and second long arm portions 410 and 420 and the first and second short arm portions 430 and 440 extend in their lengthwise direction.

The first and second long arm portions 410 and 420 comprise seven second absorbers 470 on the first surface 220, and the first and second short arm portions 430 and 440 comprise five second absorbers 470 on the first surface 220. Each second absorber 470 is ring shaped, is situated concentrically with the third absorbers 231 and 232, and projects from the first surface 220 toward the axis of the base 200. The length of the second absorbers 470 in their radial direction is termed their width, and their length in their axial direction is termed their thickness. The widths and thicknesses are approximately the same.

The distances between second absorbers 470 in their radial direction are approximately the same as the distances between the inner concentric projection 231 and the outer concentric projection 232. The distance between the innermost second absorber 470 and the outer concentric projection 232 in their radial direction is approximately the same as the distance between the inner concentric projection 231 and the outer concentric projection 232.

The substrate may be attached to the second surface 240 which is the rear side of the first surface 220. The second engaging members 480 are provided on the edge of the first and second long arm portions 410 and 420 and the first and second short portions 430 and 440, and used for attaching the substrate to the mounting device. The second engaging members 480 project toward the axis of the base 200 from the second surface 240 of the first and second long arm portions 410 and 420 and the first and second short arm portions 430 and 440.

The second engaging members 480 comprise fitting portions 481 which project from the second surface 240 of the edge of the second mounting arm 400 and stopping portions 482 which are provided on the edge of each fitting portions 481. The fitting portions 481 are cylindrical, and the stopping portions 482 are truncated cones which are connected with the fitting portions coaxially. The maximum diameter of the stopping portions 482 is larger than that of the fitting portions 481. The edge of the stopping portions 482 which has the largest diameter is jointed with the edge of the fitting portions 481, so that steps are formed between the fitting portions 481 and the stopping portions 482. A cylindrical tube 483 passes through the second engaging members 480 from the stopping portions 482 to the first surface 220. The central axis of the cylindrical tube 483 is coaxial with the axis of the Stopping portions 462 and the fitting portions 481. There is no projecting portion on the second surface 240 except for the second engaging members 480.

The four first mounting arms 300 are provided on the outer edge of the base 200, and extend along the straight lines which extend in the radial direction of the base 200 and intersect the axis of the base 200. The thickness of the first mounting arms 300 is the same as the thickness of the base 200. The front and rear surfaces of the first mounting arms 300 form a continuous surface with the first surface 220 and the second surface 240, thereby extending the first and the second surfaces 220 and 240.

The first mounting arms 300 have the four arms, i.e. the first arm portion 310, the second arm portion 320, the third arm portion 330, and the fourth arm portion 340. Each of the first, second, third and fourth arm portions 310, 320, 330 and 340 have the same width and length. The first and third arm portions 310 and 330 are provided between each of the second mounting arms 400 so as to be symmetric with respect to the axis of the base 200. The second and fourth arm portions 320 and 340 are similarly arranged.

The pair of the first and second arm portions 310 and 320 and the pair of the second and fourth arm portions 330 and 340 are symmetric with respect to the line which intersects the center axis of the base 200 and follows the extension direction of the first and second long arm portions 410 and 420. The pair of the first and fourth arm portions 310 and 340 and the pair of the second and third arm portions 320 and 330 are symmetric about the line which intersects the center axis of the base 200 and follows the extension direction of the first and second short arm portions 430 and 440.

Two first holes 350 are oblong, and provided across approximately the entire length of the first to fourth arms 310, 320, 330 and 340, so as to be parallel to each other. The first holes 350 pass through each of the first mounting arms in a direction orthogonal to the extension direction (the thickness direction) of the first to fourth arm portions 310, 320, 330 and 340. The width of the first holes 350 is approximately ⅕ of the width of the first to fourth arm portions 310, 320, 330 and 340. The first to fourth arm portions 310, 320, 330 and 340 stretch easily in the length direction due to the first holes 350.

The first absorber 360 is provided on the first surface 220 of the first to fourth arm portions 310, 320, 330 and 340. Five first absorbers 360 are provided concentrically with the third absorbers 231 and 232. The five first absorbers project from the first surface 220 along the axis of the base 200. Each first absorber 360 has width in its radial direction, and thickness in its axial direction. The width and thickness are approximately the same. The distances between the first absorbers are approximately the same as the distance between the inner concentric portion 231 and the outer concentric portion 232 in the base 200. The distance between the first absorber which is located inwardly and the outer concentric portion 232 is approximately the same as the distance between the inner concentric portion 231 and the outer concentric portion 232.

The first engaging portions 370 are provided on the edges of the first to fourth arm portions 310, 320, 330 and 340 for attaching a liquid crystal panel. The first engaging portions 370 project from the first surface 220 along the axis of the base 200.

The first engaging portions 370 comprise elbow portions and cover plates. The elbow portions 371 are made of two connected rectangular plates which project in the direction orthogonal to the projection direction of the first to fourth mounting arm 310, 320, 330 and 340. The cover plates 372 hang across the first and second side 377 and 378 which comprise the edges of the projection direction of the elbow portions 371. The internal right angle formed by the plates faces the base. The first and second sides 377 and 378 form L-shaped edges. The arm-engaging portions 373 are provided on the first to fourth arms 310, 320, 330 and 340, and face the elbow portions 371.

The cover plates 372 have a triangular shape, and cover the triangles formed by the apex angle of the L-shaped edge and the two points which protrude approximately ⅔ of the entire length of the first and second sides 377 and 378 from the apex angle. The arm-connecting portion 373 has quadrangular-prism shape formed by the two arms of the L-shaped edge, its thickness is approximately the same as that of the first to fourth arm portions 310, 320, 330 and 340.

The first engaging portion 370 is connected to the center of the arm-connecting portion 373 with the edge of the first to fourth arm portions 310, 320, 330 and 340. Viewed from the axis of the base 200, the apex angle of the elbow portion 371 is bisected by the straight line which runs through the center axis of the base 200 and along the extension direction of the first and third arm portions 310 and 330 as well as the second and fourth arm portions 320 and 340. That is, the axis of the base 200 intersects the bisecting line of the apex angle of the elbow portion 371. The L-shaped edge and the arm-engaging portions 373 form a continuous surface with the second surface 240 of the first to fourth arm portions 310, 320, 330 and 340, and extend the second surface 240. The arm-engaging portions 373 form a continuous surface with the first surface 220 of the first to fourth arm portions 310, 320, 330 and 340, and extend the first surface 220.

The projection 374 is provided on the first surface 220 of the arm-connecting portion 373 so as to go across the arm-connecting portion 373. The width and the thickness of the projection 374 are approximately the same as that of the first absorbers 360. The projection 374 projects parallel to the first absorber 360 and along the projection direction of the first absorber 360.

Figure 10:
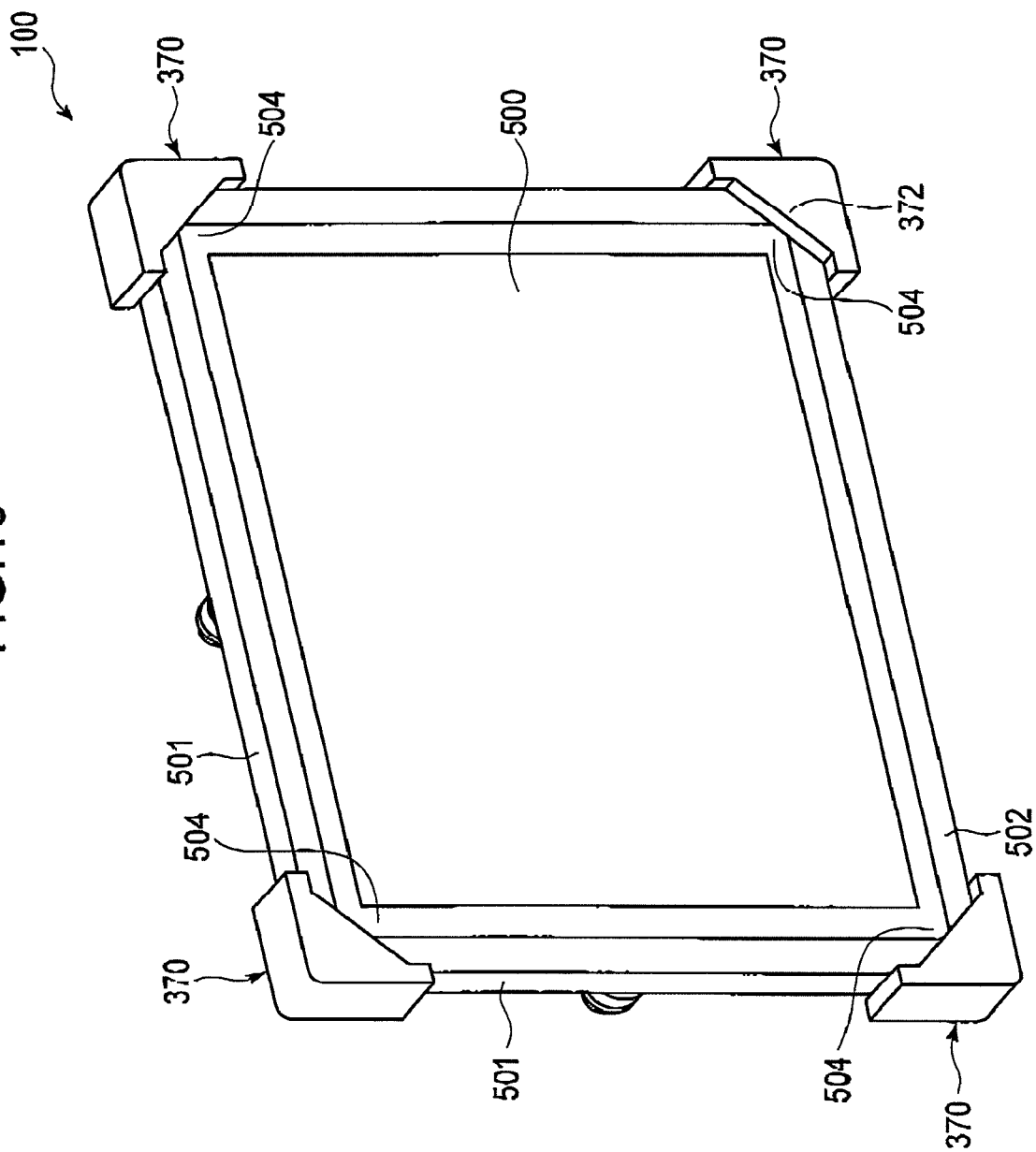
FIG. 10 is a perspective view of the mounting device which is mounted to the liquid crystal panel, taken from the front left.
Figure 11:
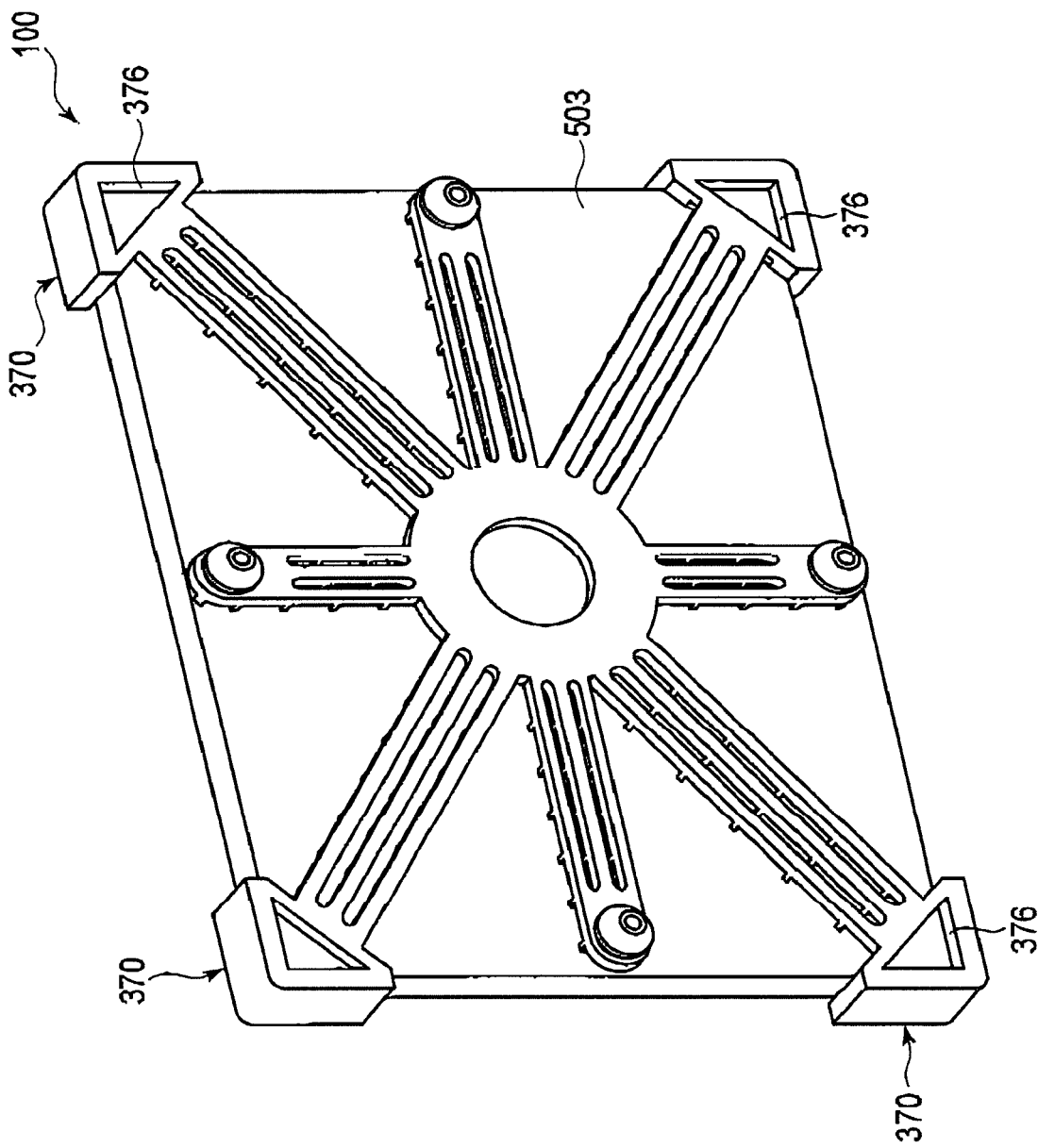
FIG. 11 is a perspective view of the mounting device which is mounted to the liquid crystal panel, taken from the back right.
Figure 12:
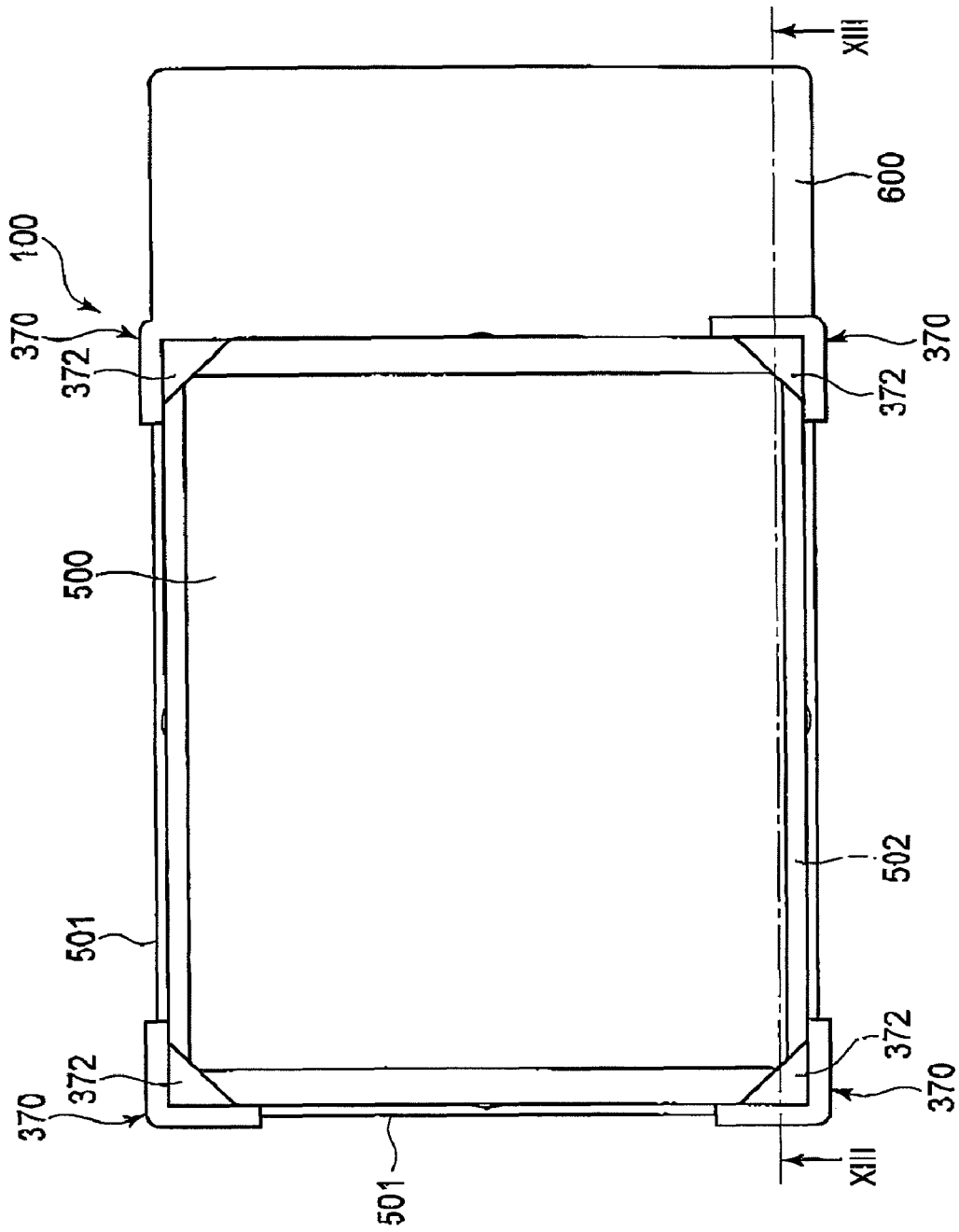
FIG. 12 is a front view of the mounting device which is mounted on the liquid crystal panel and the substrate.

The mounting device 100 to which a liquid crystal panel is attached is described below with reference to FIGS. 10 and 11.

The liquid crystal panel 500 is attached to the first surface 220 of the mounting device 100. The length of the liquid crystal panel 500 along its diagonal direction is longer than the distance between the first engaging portions 370. Therefore, the first engaging portions 370 extend the first to fourth arm portions 310, 320, 330 and 340 so as to engage the corners 504 of the liquid crystal panel 500. The end face 501 of the liquid crystal panel 500 engages the inner surface 376 which forms the inner angle of the elbow portion 371. The front surface 502 of the liquid crystal panel 500 on which a display is mounted engages the cover plate 372. The rear surface 503 of the liquid crystal panel 500 engages the projection 374 which is provided in the arm-connecting portion 373.

The base 200 and the first to fourth arm portions 310, 320, 330 and 340 are stretched so that the liquid crystal panel 500 is attached to the mounting device 100. The liquid crystal panel 500 is flexibly held to the mounting device 100 by the elasticity of the base 200 and the first to fourth arm portions 310, 320, 330 and 340. The first to fourth arm portions 310, 320, 330 and 340 may evenly project in any direction because the base 200 is circular. The mounting device 100 may be attached to liquid crystal panels of various sizes because the first to fourth arm portions 310, 320, 330 and 340 stretch.

The first, second and third absorber 360, 470, 231 and 232 contact the rear surface 503 of the liquid crystal panel 500. The force created between the liquid crystal panel 500 and the mounting device 100 is absorbed by these absorbers. The force created between the liquid crystal panel 500 and the mounting device 100, and along the stretching direction of the first to fourth arm portions 310, 320, 330 and 340 is absorbed by these arm portions because these arm portions are elastic.

The mounting device 100 to which a substrate 600 is attached is described below with reference to the FIGS. 12 to 15.

The base 600 is attached to the second surface 240 of the mounting device 100. The substrate 600 has four substrate holes 601. The substrate holes 601 fit the second engaging portions 480. The distances between the substrate holes 601 are greater than the distance between each of the first and second long arm portions 410 and 420 and each of the first and second short arm portions 430 and 440. Therefore, the second engaging portions 480 engage with the substrate boles 601 only by the stretching of the first and second long arm portions 410 and 420 or each of the first and second short arm portions 430 and 440.

The stopping portion 482 passes through the substrate hole 601 and the fitting portion 4S1 fits the substrate hole 601, so that the second engaging portion 480 engages with the substrate hole 601. The substrate 600 engages the step portions 484 which are created between the stopping portions 482 and the fitting portions 481, and are not easily disengaged from the second engaging portions 480.

The tube 483 is provided in the perimeter of the central axis of the fitting portions 481 and the stopping portions 482, so that the diameter of the stopping portions 482 may be reduced when the stopping portions 482 pass through the substrate holes 601. Therefore, the stopping portions 482 may easily pass through the substrate holes 601.

The force created between the liquid crystal panel 600 and the mounting device 100, and along the stretching direction of the first and second long arm portions 410 and 420, is absorbed by these arm portions because these arm portions are elastic. The force created between the liquid crystal panel 600 and the mounting device 100, and along the stretching direction of the first and second short arm portions 430 and 440, is absorbed by these arm portions because these arm portions are elastic. The first and second long arm portions 410 and 420 may project evenly have elasticity because the base 200 is circular. The first and second short arm portions 430 and 440 may evenly project in any direction because the base 200 is circular. The arms which are used for attaching the liquid crystal panel 500 to the substrate 600 are provided separately, so that a liquid crystal panel 500 of different size than the substrate 600 may be attached to the substrate 600.

Figure 13:
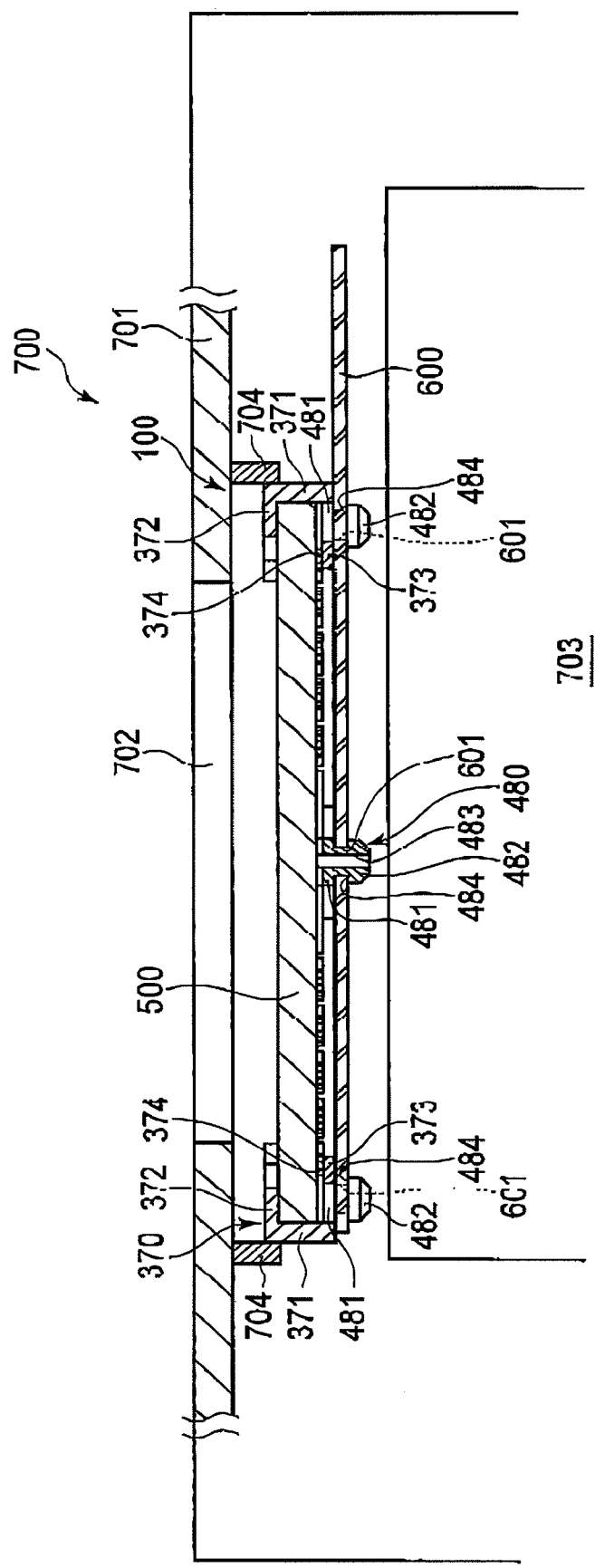
FIG. 13 is a cross-sectional view of the mounting device, taken along line XIII-XIII of FIG. 12.

Referring to FIG. 13, the mounting device 100 is used to attach the liquid crystal panel 500 and the substrate 600 to the digital camera 700. The digital camera 700 has an exterior member 701 and an inner member 703. The inner member 703 may be an electric part (e.g. a CCD) or a mechanical structure (e.g. a vibration isolation mechanism). The exterior member 701 has a hole to fit a cover glass 702. The liquid crystal panel 500 is placed such that a user can see the image displayed on the liquid crystal panel 500 through the cover glass 702. The exterior member 701 has flanges 704 which project from an inner surface of the exterior member 701. The four corners of the mounting device 100 engage the flanges 704, so that the mounting device 100 is held flexibly in the digital c 100. Thus, the liquid crystal panel 500 and the substrate 600 are protected from impacts.

According to the embodiment, a mounting device 100 which absorbs and tempers the force created between the members, while easily attaching the members has hereby been provided.

Note that, the four first mounting arms 300 may be omitted, so long as at least two mounting arms extending in the direction opposite each other along a straight line may be provided. The same applies to the four second mounting arms 400.

Note that the first engaging portions 370 may be substituted by the second engaging portions 480 and that the second engaging portions 480 may be substituted by the first engaging portions 370.

The two first holes 350 may be omitted for each of the arms, and one or more than two holes may be provided. The second holes 450 may be omitted as well.

Regarding the L-shaped edges, the inner angle created by the first and second sides 377 and 378 may be other than orthogonal, and may be of an angle which enables the L-shaped edges to engage the corners 504 of the liquid crystal panel 500.

The cover plates 372 may cover the entire length of the first and second side 377 and 378, or intermittently cover their length. The total length covered may satisfy the requirement that the mounting device hold the liquid crystal panel 500 fast.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-196029 (filed on Jul. 27, 2007), which is expressly incorporated herein, by reference, in its entirety.

The invention claimed is:

1. A mounting device comprising:
   a base that is annular and has an elastic body;
   first mounting arms that have elastic bodies and extend from said base in the outward radial direction of said base;
   second mounting arms that have elastic bodies and extend from said base in the outward radial direction of said base;
   first engaging portions that project orthogonally to the axis of said base from the edge of said first mounting arms; and
   second engaging portions that project in the direction opposite to the projection direction of said first engaging portions, from the edge of said second mounting arms;
   said first engaging portions projecting parallel to each other in the same direction.

2. The mounting device according to claim 1, wherein said first mounting arms comprise first holes that pass through each of said first mounting arms in a direction orthogonal to the extension direction of said first mounting arms, and said second mounting arms comprise second holes that pass through each of said second mounting arms in a direction orthogonal to the extension direction of said second mounting arms.

3. The mounting device according to claim 1, wherein said base comprises a third hole that is cylindrical and passes through said base, and the central axis of said third hole is coaxial with the central axis of said base.

4. The mounting device according to claim 1, wherein each of said first mounting arms comprises a first absorber that projects parallel to the projection direction of said first engaging portion, each of said second mounting arms comprises a second absorber that projects parallel to the projection direction of said first engaging portion, and said base comprises a third absorber that projects parallel to the projection direction of said first engaging portion.

5. The mounting device according to claim 4, wherein said first, second, and third absorbers are provided on concentric circles around the axis of said base, and are evenly spaced in the radial direction of said base, and the lengths of said first, second and third absorbers along the axis of said base being equal.

6. The mounting device according to claim 1, wherein said first engaging portion comprises an elbow portion that is made by connecting two rectangular plates which project in the direction orthogonal to the projection direction of said first mounting arm, and a cover plate that hangs across the first and second sides which are the edges of said elbow portions in their projection direction, and the internal angle formed by said plates faces said base.

7. The mounting device according to claim 6, wherein the bisector of said inner angle intersects the axis of said base.

8. The mounting device according to claim 1, wherein said second engaging portion comprises a fitting portion that projects from the edge of said second mounting arm and a stopping portion that is provided on the edge of said fitting portion, and the projected area of said stopping portion which projects toward the orthogonal surface of the projection direction of said engaging portion being larger than that of said fitting portion.

9. The mounting device according to claim 1, wherein said first engaging portions may hold corners of a liquid crystal panel.

10. A digital camera comprising:
    said mounting device described in claim 1;
    an exterior member that is provided on an exterior of said digital camera; and
    inner members that is provided in said digital camera;
    said mounting device being provided between said exterior member and the inner members.

* * * * *